(12) United States Patent
Malakar et al.

(10) Patent No.: US 12,532,044 B2
(45) Date of Patent: Jan. 20, 2026

(54) METHOD AND SYSTEM FOR ACCESSING USER RELEVANT MULTIMEDIA CONTENT WITHIN MULTIMEDIA FILES

(71) Applicant: HCL Technologies Limited, New Delhi (IN)

(72) Inventors: Sujit Malakar, Noida (IN); Harikrishna C Warrier, Bengaluru (IN); Yogesh Gupta, Noida (IN)

(73) Assignee: HCL Technologies Limited, New Delhi (IN)

( * ) Notice: Subject to any disclaimer, the term of this patent is extended or adjusted under 35 U.S.C. 154(b) by 160 days.

(21) Appl. No.: 18/237,919

(22) Filed: Aug. 25, 2023

(65) Prior Publication Data

US 2024/0073476 A1 Feb. 29, 2024

(51) Int. Cl.
*H04N 21/431* (2011.01)
*G06F 3/0482* (2013.01)
(Continued)

(52) U.S. Cl.
CPC ....... *H04N 21/4316* (2013.01); *G06F 3/0482* (2013.01); *G06F 40/30* (2020.01);
(Continued)

(58) Field of Classification Search
CPC ...... G06F 40/30; G06F 3/0485; G06F 3/0482; G06F 40/279; H04N 21/4665;
(Continued)

(56) References Cited

U.S. PATENT DOCUMENTS

| 8,230,343 B2 | 7/2012 | Logan et al. |
| 9,602,738 B2 | 3/2017 | Choe et al. |

(Continued)

FOREIGN PATENT DOCUMENTS

| CN | 109189987 A | 1/2019 |
| CN | 109543102 A | 3/2019 |

(Continued)

OTHER PUBLICATIONS

Tanmay Bhowmik, Aman Rai, Soumya Pandey, Prudhviraj Boddu, Nilay Patel, Veni S, and Vignatha Manchala; A novel approach towards voice-based video content search; IEEE Xplore; p. 1 to 5; University of Exeter; Apr. 2-4, 2021; Pune, India.

(Continued)

*Primary Examiner* — Ngoc K Vu
(74) *Attorney, Agent, or Firm* — Kendal M. Sheets

(57) ABSTRACT

A method for generating a temporal token file to enable access to selective multimedia content within a multimedia file is disclosed. In some embodiments, the method includes identifying a plurality of multimedia content present within the multimedia file. The method further includes generating a token file for each of the plurality of multimedia content. To generate the token file, the method includes retrieving a plurality of snippets from each of the plurality of multimedia content; and annotating each of the plurality of snippets with a textual token. The method further includes extracting a timestamp associated with each of the plurality of snippets. The method further includes generating the temporal token file associated with each of the plurality of multimedia content based on the token file and the timestamp extracted for each of the plurality of snippets.

12 Claims, 14 Drawing Sheets

(51) Int. Cl.
*G06F 40/30* (2020.01)
*G06V 20/70* (2022.01)
*H04L 9/32* (2006.01)
*H04N 21/466* (2011.01)
*H04N 21/845* (2011.01)
*H04N 21/8547* (2011.01)

(52) U.S. Cl.
CPC ............ *G06V 20/70* (2022.01); *H04L 9/3213* (2013.01); *H04N 21/4665* (2013.01); *H04N 21/8456* (2013.01); *H04N 21/8547* (2013.01)

(58) Field of Classification Search
CPC ........... H04N 21/4316; H04N 21/8456; H04N 21/8547; H04N 21/8549; H04L 9/3213; H04L 9/3297; H04L 2209/60; G06V 20/70
See application file for complete search history.

(56) References Cited

U.S. PATENT DOCUMENTS

| | | | |
|---|---|---|---|
| 10,528,631 B1* | 1/2020 | Nordhagen | G06F 16/9535 |
| 2014/0064698 A1* | 3/2014 | Lin | H04N 9/8227 |
| | | | 386/241 |
| 2014/0164507 A1 | 6/2014 | Tesch et al. | |
| 2015/0213793 A1 | 7/2015 | Phelan et al. | |
| 2021/0012810 A1* | 1/2021 | Kulkarni | G11B 27/10 |
| 2023/0336845 A1* | 10/2023 | Henn | G06F 16/739 |
| 2024/0214651 A1* | 6/2024 | Lyu | G06F 40/186 |

FOREIGN PATENT DOCUMENTS

| | | |
|---|---|---|
| CN | 111984823 A | 11/2020 |
| HK | 40043886 A | 9/2021 |
| WO | 2019069997 A1 | 4/2019 |

OTHER PUBLICATIONS

Sunakshi Mehra and Seba Susan, Improving Word Recognition in Speech Transcriptions by Decision-level Fusion of Stemming and Two-way Phoneme Pruning, International Advanced Computing Conference (2020), Department of Information Technology, Delhi.

* cited by examiner

METHOD AND SYSTEM FOR ACCESSING USER RELEVANT MULTIMEDIA CONTENT WITHIN MULTIMEDIA FILES

TECHNICAL FIELD

Generally, the invention relates to multimedia content. More specifically, the invention relates to method and system for accessing user relevant multimedia content within multimedia files.

BACKGROUND

Consumption of media content, particularly online multimedia associated with entertainment, education, sports, and infotainment has grown significantly in recent years. Moreover, with advancement in digital technology, multimedia content consumers not only focus on type of media content they are viewing, but also on flexibility in viewing media content of their choice that enhances their viewing experience. There has been significant technological advancement in enhancing viewership of media content to media consumers by providing intuitive user interface. However, searching and retrieving relevant videos in a meaningful way on web is still an open problem. Additionally, searching for a particular portion of video content or cognitive information inside a video or any media content in area of interest is also difficult. In other words, as amount of user-generated content (UGC) has seen a vast growth on websites such as "Youtube", people often face difficulty in finding relevant multimedia content from the vast multimedia content available to them. Unfortunately, this minimally required production effort and dispersion of multimedia content makes searching of relevant multimedia content problematic.

Therefore, there is a need of implementing an efficient and reliable technique for providing an access of user selective multimedia content within a multimedia file.

SUMMARY OF INVENTION

In one embodiment, a method of generating a temporal token file to enable access to selective multimedia content within a multimedia file is disclosed. The method may include identifying a plurality of multimedia content present within the multimedia file. It should be noted that each of the plurality of multimedia content may comprise at least one of an audio stream and a video stream. The method may include generating a token file for each of the plurality of multimedia content. The method of generating the token file may include retrieving a plurality of snippets from each of the plurality of multimedia content. The method of generating the token file may further include annotating each of the plurality of snippets with a textual token based on a Natural Language Processing (NLP) based technique. It should be noted that, each of the plurality of snippets may include one or more attributes and each of the textual token may represent one of the one or more attributes. The method may include extracting a timestamp associated with each of the plurality of snippets. It should be noted that, the extracted timestamp may signify a timestamp of an occurrence of each of the one or more attributes within each of the plurality of snippets. The method may include generating the temporal token file associated with each of the plurality of multimedia content based on the token file and the timestamp extracted for each of the plurality of snippets. It should be noted that, the temporal token file may be linked to the multimedia file.

In another embodiment, a system for generating a temporal token file to enable access to selective multimedia content within a multimedia file is disclosed. The system includes a processor and a memory communicatively coupled to the processor. The memory may store processor-executable instructions, which, on execution, may cause the processor to identify a plurality of multimedia content present within the multimedia file. It should be noted that, each of the plurality of multimedia content may comprise at least one of an audio stream and a video stream. The processor-executable instructions, on execution, may further cause the processor to generate a token file for each of the plurality of multimedia content. To generate the token file, the processor-executable instructions, on execution, may further cause the processor to retrieve a plurality of snippets from each of the plurality of multimedia content. To generate the token file, the processor-executable instructions, on execution, may further cause the processor to annotate each of the plurality of snippets with a textual token based on a Natural Language Processing (NLP) based technique. It should be noted that, each of the plurality of snippets may include one or more attributes and each of the textual token may represent one of the one or more attributes. The processor-executable instructions, on execution, may further cause the processor to extract a timestamp associated with each of the plurality of snippets. It should be noted that, the extracted timestamp may signify a timestamp of an occurrence of each of the one or more attributes within each of the plurality of snippets. The processor-executable instructions, on execution, may further cause the processor to generate the temporal token file associated with each of the plurality of multimedia content based on the token file and the timestamp extracted for each of the plurality of snippets. It should be noted that, the temporal token file may be linked to the multimedia file.

In yet another embodiment, a method for accessing selective multimedia content within a multimedia file is disclosed. The method may include receiving from a user, a user input for accessing at least one of a plurality of multimedia content present within the multimedia file. It should be noted that, each of the plurality of multimedia content may comprise a plurality of snippets and each of the plurality of snippets may include one or more attributes. The method may include analysing a temporal token file associated with each of the plurality of multimedia content upon receiving the user input. It should be noted that, the temporal token file may be generated based on a token file and a timestamp associated with each of the plurality of snippets, and the token file may comprise a textual token representing the one or more attributes present within the plurality of snippets. The method may include identifying the at least one of the plurality of multimedia content in response to the analysis. The method may include selectively providing access of the at least one of the plurality of multimedia content to the user.

In yet another embodiment, a system for accessing selective multimedia content within a multimedia file is disclosed. The system includes a processor and a memory communicatively coupled to the processor. The memory may store processor-executable instructions, which, on execution, may cause the processor to receive from a user, a user input for accessing at least one of a plurality of multimedia content present within the multimedia file. It should be noted that, each of the plurality of multimedia content may comprise a plurality of snippets and each of the plurality of snippets may include one or more attributes. The processor-executable instructions, on execution, may further cause the processor to analyse a temporal token file associated with each of the plurality of multimedia content upon receiving the user input. It should be noted that, the temporal token file may be generated based on a token file and a timestamp associated with each of the plurality of snippets, and the token file may comprise a textual token representing the one or more attributes present within the plurality of snippets. The processor-executable instructions, on execution, may further cause the processor to identify the at least one of the plurality of multimedia content in response to the analysis. The method may include selectively providing access of the at least one of the plurality of multimedia content to the user.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
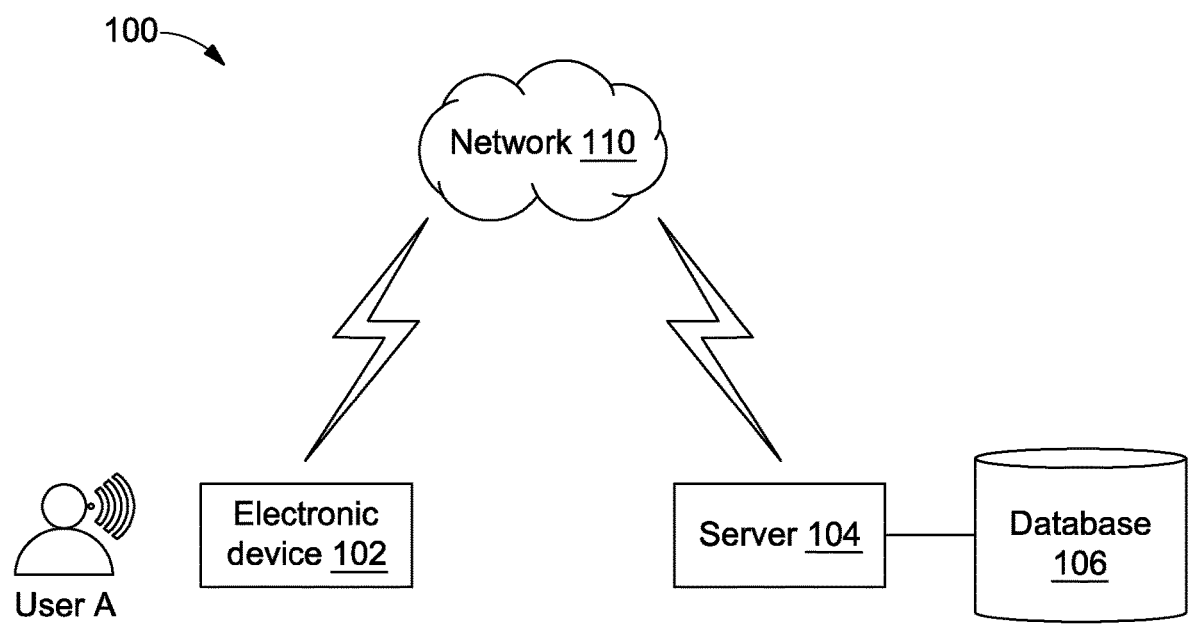
FIG. 1 illustrates a functional block diagram of a system configured to generate a temporal token file to enable access to selective multimedia content within a multimedia file, in accordance with an embodiment.

A functional block diagram of a system 100 configured to generate a temporal token file to enable access to selective multimedia content within a multimedia file is illustrated in FIG. 1, in accordance with an embodiment. In order to generate the temporal token file, the system 100 may include an electronic device 102. The electronic device 102 may be configured to generate the temporal token file. As will be appreciated, the electronic device 102 may generate the temporal token file via a server 104. Examples of the server 104, may include, but are not limited to a mobile phone, a laptop, a desktop, or a PDA, an application server, and so forth. The electronic device 102 may communicate with the server 106 over a network 110. The network 110 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

In order to generate the temporal token file, the electronic device 102 may be configured to identify a plurality of multimedia content present within the multimedia file. In an embodiment, each of the plurality of multimedia content may include at least one of an audio stream or a video stream. By way of an example, the multimedia file may correspond to a video file. In addition, the plurality of multimedia content for the video file may correspond to video content (i.e., the video stream) and audio content (i.e., the audio stream) present in the video file. In the video file, the audio stream and the video stream may be related and may in synchronization with a timestamp. In some embodiment, in addition to the video content and the audio content, the plurality of multimedia content for the video file may also include a subtitle stream in the video file. Examples of the electronic device 102 may but is not limited to a smart phone, a laptop, a desktop, a Personal Digital Assistants (PDA), or an application server, and so forth.

Upon identifying the plurality of multimedia content within the multimedia file, the electronic device 102 may be configured to generate a token file for each of the plurality of multimedia content. In order to generate the token file for each of the plurality of multimedia content, the electronic device 102 may be configured to retrieve a plurality of snippets from each of the plurality of multimedia content. In an embodiment, each of the plurality of snippets may correspond to a portion of a multimedia content from the plurality of multimedia content. Upon retrieving the plurality of snippets, the electronic device 102 may annotate each of the plurality of snippets with a textual token based on a Natural Language Processing (NLP) based technique. In an embodiment, each of the plurality of snippets may include one or more attributes. Moreover, each of the textual token may represent one of the one or more attributes present within each of the plurality of snippets. By way of an example, the one or more attributes present within each of the portion of the video file may correspond to any entity present in the video file, such as persons, instruments, places, animals, and the like. A method of generating the token file is further explained in detail in reference to FIG. 4 and FIG. 5.

Once the token file is generated, the electronic device 102 may be configured to extract a timestamp associated with each of the plurality of snippets. In an embodiment, the extracted timestamp may signify a timestamp of an occurrence of each of the one or more attributes within each of the plurality of snippets. By way of an example, the timestamp of each occurrence of a person (e.g., an attribute) in each of the plurality of snippets retrieved from the plurality of multimedia content of the video file may be extracted. Upon extracting the timestamp for each of the plurality of snippets, the electronic device 102 may generate a temporal token file associated with the plurality of multimedia content of the multimedia file. Further, the generated temporal token file may be linked to the multimedia file. In an embodiment, the temporal token file may be generated based on the token file and the timestamp extracted for each of the plurality of snippets. In an embodiment, the electronic device 102 may store the generated temporal token file in a database 106 of the server 104.

Once the temporal token file associated with the multimedia file is generated and stored, it token file may be used to provide access of selective multimedia content present within the multimedia file, to a user A. In order to access the selective multimedia content, the user A may provide a user input via the electronic device 102 to access at least one of the plurality of multimedia content present within the multimedia file. In one embodiment, the user input may include a user selection of at least one of a set of information associated with at least one of the plurality of snippets based on a requirement of the user A. Further, the set of information may include a sentiment associated with each of the plurality of snippets, a number of occurrences of each of the one or more attributes within each of the plurality of snippets, and a content classification category. The sentiment associated with each of the plurality of snippets at least one of a positive sentiment, a negative sentiment, or a neutral sentiment. The content classification category associated with each of the plurality of snippets may be at least one of an objectionable content category, a non-objectionable content category, an offensive content category, and an unwanted content category. In another embodiment, the user input may include an input for generating a summary corresponding to at least one of the plurality of multimedia content present within the multimedia file. In some embodiment, the user input may be an input for generating a summary corresponding to one of the one or more attributes present with each of the plurality of snippets. As will be appreciated, the user input may be one of a voice input or a text input.

Upon receiving the user input, the electronic device 102 may be configured to analyze the temporal token file stored in the database 108 via the server 106. The electronic device 102 may interact with the server via the network 110. Based on the analysis of the temporal token file, the electronic device 102 may identify the at least one of the plurality of multimedia content that the user A wants to access. Once the at least one of the plurality of multimedia content is identified, the user A may access the at least one of the plurality of multimedia content via the electronic device 102. A method for providing access of selective multimedia content to the user A is further explained in detail in conjunction with FIG. 6 to FIG. 8.

Figure 2:
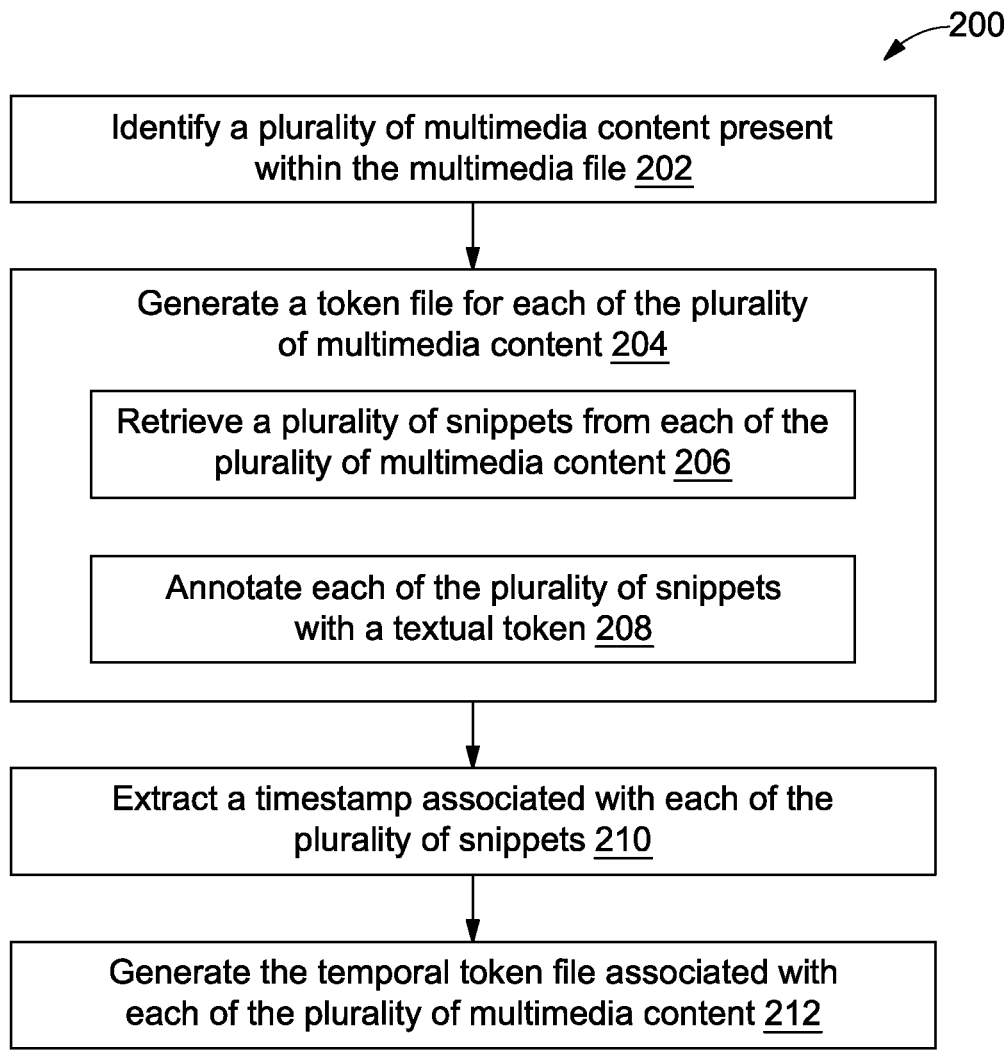
FIG. 2 illustrates a flowchart of a method for generating a temporal token file to enable access to selective multimedia content within a multimedia file, in accordance with an embodiment.

Referring now to FIG. 2, a flowchart 200 of a method for generating a temporal token file to enable access to selective multimedia content within a multimedia file is illustrated, in accordance with an embodiment. In order to generate the temporal token file for the multimedia file, initially at step 202, a plurality of multimedia content present within the multimedia file may be identified. In an embodiment, each of the plurality of multimedia content may include at least one of an audio stream and a video stream. Upon identifying the plurality of multimedia content, at step 204, a token file may be generated for each of the plurality of multimedia content.

In order to generate the token file, at step 206, a plurality of snippets may be retrieved from each of the plurality of multimedia content. Once the plurality of snippets are retrieved, at step 208, each of the plurality of snippets may be annotated with a textual token. The annotation of each of the plurality of snippets with the textual token may be done based on a Natural Language Processing (NLP) based technique. Example of NLP based techniques may include, but is not limited to, sentiment analysis technique, text mining technique, name entity relationship technique, text classification technique, summarization technique, and the like. In an embodiment, each of the plurality of snippets may include one or more attributes. In addition, each of the textual token may represent one of the one or more attributes. A method of generating the temporal token file for each of the plurality of multimedia content is further explained in detail in conjunction with FIG. 3 and FIG. 4.

Once the token file is generated, at step 210, a timestamp associated with each of the plurality of snippets may be extracted. In an embodiment, the timestamp extracted for each of the plurality of snippets may signify a timestamp of an occurrence of each of the one or more attributes within each of the plurality of snippets. Upon extracting the timestamp, at step 212, the temporal token file may be generated. The generated temporal token file may be associated with each of the plurality of multimedia content. Moreover, the temporal token file may be generated based on the token file and the timestamp extracted for each of the plurality of snippets may be generated. A method of generating the temporal token file is further explained in detail via an exemplary embodiment in conjunction with FIG. 5. Further, the generated temporal token file may be linked to the multimedia file. This generated temporal token file may provide access of selective multimedia content to the user within the multimedia file. A method of providing access of selective multimedia content to the user within the multimedia file is further explained in detail in conjunction with FIG. 6 to FIG. 8.

Figure 3:
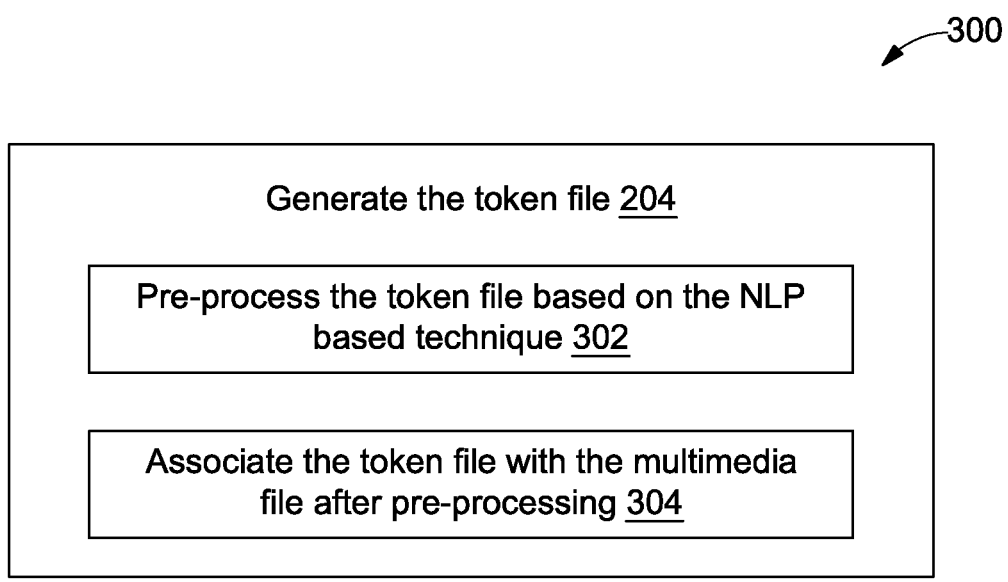
FIG. 3 illustrates a flowchart of a method for generating a token file for each of a plurality of multimedia content, in accordance with an embodiment.

Referring now to FIG. 3, a flowchart of a method 300 for generating a token file for each of a plurality of multimedia content is illustrated, in accordance with an embodiment. With reference to FIG. 2, in order to generate the token file as mentioned via the step 204, at step 302, the token file may be pre-processed. The preprocessing of the token file may be done based on an NLP based technique. A method of pre-processing the token file is further explained in detail in conjunction with FIG. 4. In order to pre-process the token file, initially, the plurality of snippets may be retrieved from the plurality of multimedia content present within the multimedia file.

Once the plurality of snippets is retrieved, each of the plurality of snippets may be annotated with the textual token. In an embodiment, each of the plurality of snippets may include one or more attributes. Examples of the one or more attributes may include any entity present in the plurality of multimedia content of the multimedia file, such as, mountain, person, animal, chair, weapon, any object, and the like. Moreover, each of the textual token annotated to the plurality of snippets may represents one of the one or more attributes present within the each of the plurality of snippets. Upon pre-processing the token file, at step 304, the token file may be associated with the multimedia file. In an embodiment, the token file may be generated using existing transcription tools. By way of an example, the existing transcription tools convert speech available in the audio stream of each of the plurality of snippets to text by annotating the textual token to the one or more attributes in order to create the token file.

In another embodiment, the token file may be generated using subtitle stream available in the video stream. By way of an example, in order to generate the token file, the video stream with in-built subtitles present in each of the plurality of snippets may be parsed to generate the token file. The parsing of the video stream with in-built subtitles may be done to annotate the textual token to the one or more attributes present in each of the plurality of snippets. Further, the generated token file may be associated with the multimedia file. In other words, the multimedia file may be now augmented with the token file. Once the token file is generated, the timestamp associated with each of the plurality of snippets may be extracted. Further, based on the generated token file and the extracted timestamp, the temporal token file may be generated. This generated temporal token file may be used to provide access of selective multimedia content to the user.

Figure 4:
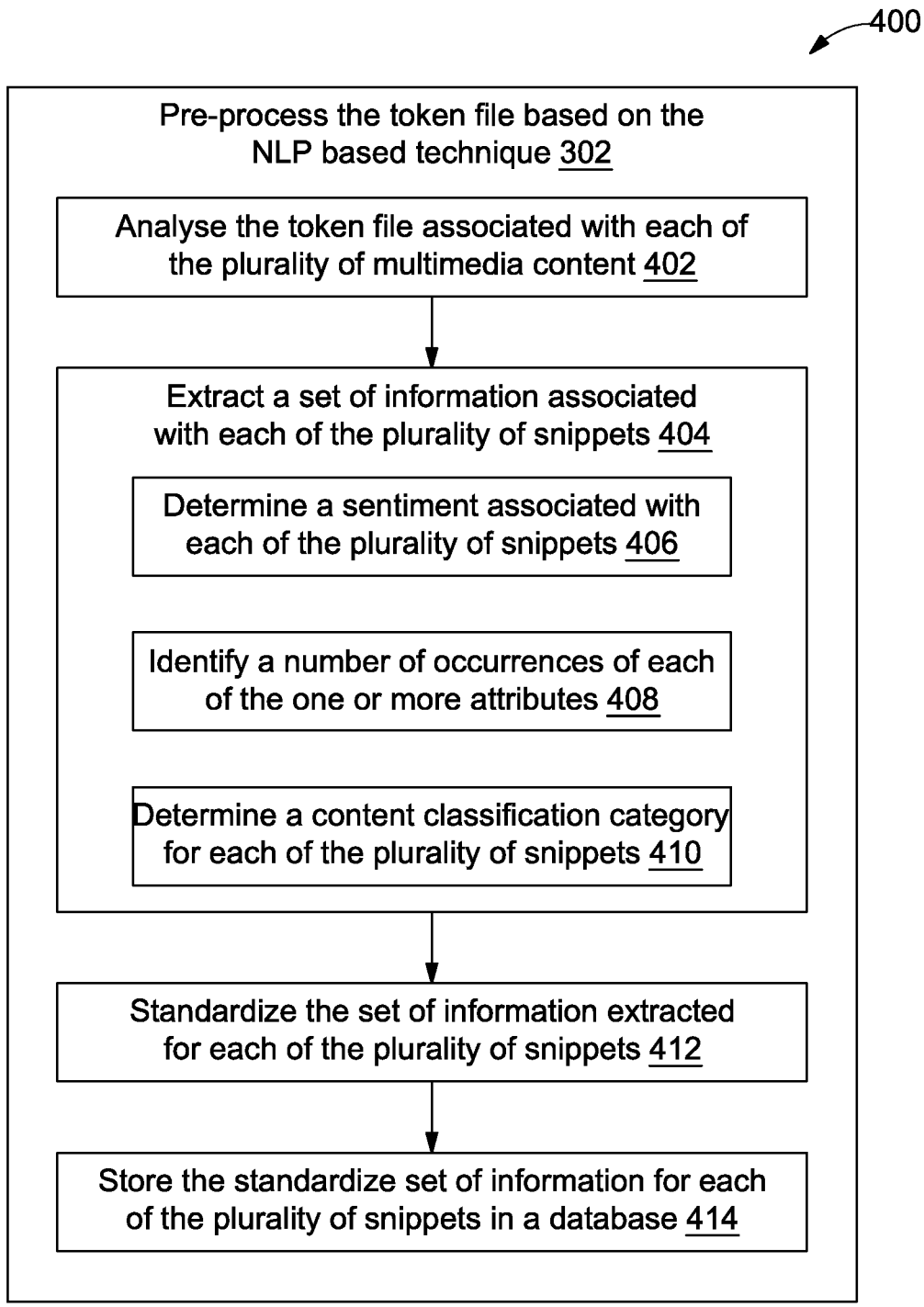
FIG. 4 illustrates a flowchart of a method for pre-processing a token file based on a Natural Language Processing (NLP) based technique, in accordance with an embodiment.

Referring now to FIG. 4, a flowchart of a method 400 for pre-processing a token file based on a NLP based technique is illustrated, in accordance with an embodiment. With reference to FIG. 3, in order to pre-process the token file as mentioned via the step 302, at step 402, the token file associated with each of the plurality of multimedia content may be analyzed. Further, at step 404, a set of information associated with each of the plurality of snippets may be extracted based on the analysis of the token file. In order to extract the set of information, at step 406, a sentiment associated with each of the plurality of snippets may be determined. In an embodiment, the sentiment associated with each of the plurality of snippets may be determined by applying a first NLP based sentiment analysis technique. The sentiment associated with each of the plurality of snippets may be at least one of a positive sentiment, a negative sentiment, or a neutral sentiment. In other words, different portions, i.e., each of the plurality of snippets of a video file (i.e., the multimedia file) may have different sentiments.

Further, at step 408, a number of occurrences of each of the one or more attributes within each of the plurality of snippets may be determined. In an embodiment, the number of occurrences of each of the one or more attributes within each of the plurality of snippets may be identified by applying a second NLP based recognition technique. Moreover, each of the one or more attributes may be assigned a unique Identification (ID) in real-time during identification of the number of occurrences of each of the one or more attributes. In addition, at step 410, a content classification category may be determined for each of the plurality of snippets. The content classification category for each of the plurality of snippets may be determined by applying one of a third NLP based classification techniques. In an embodiment, the content classification category for each of the plurality of snippets may be at least one of an objectionable content category, a non-objectionable content category, an offensive content category, and an unwanted content category.

Once the set of information, i.e., the sentiment of each of the plurality of snippets, the number of occurrences of each of the one or more attributes within each of the plurality of snippets, and the content classification category of each of the plurality of snippets is extracted, then at step 412, the set of information extracted for each of the plurality of snippets may be standardize. In an embodiment, the standardization of the set of information may be done using one of an NLP based text mining techniques, such as lemmatization technique, stop word removal technique, and the like. Once the extracted set of information is standardized, at step 414, the standardized set of information associated with each of the plurality of snippets may be stored in a database (same as the database 108).

Figure 5A:
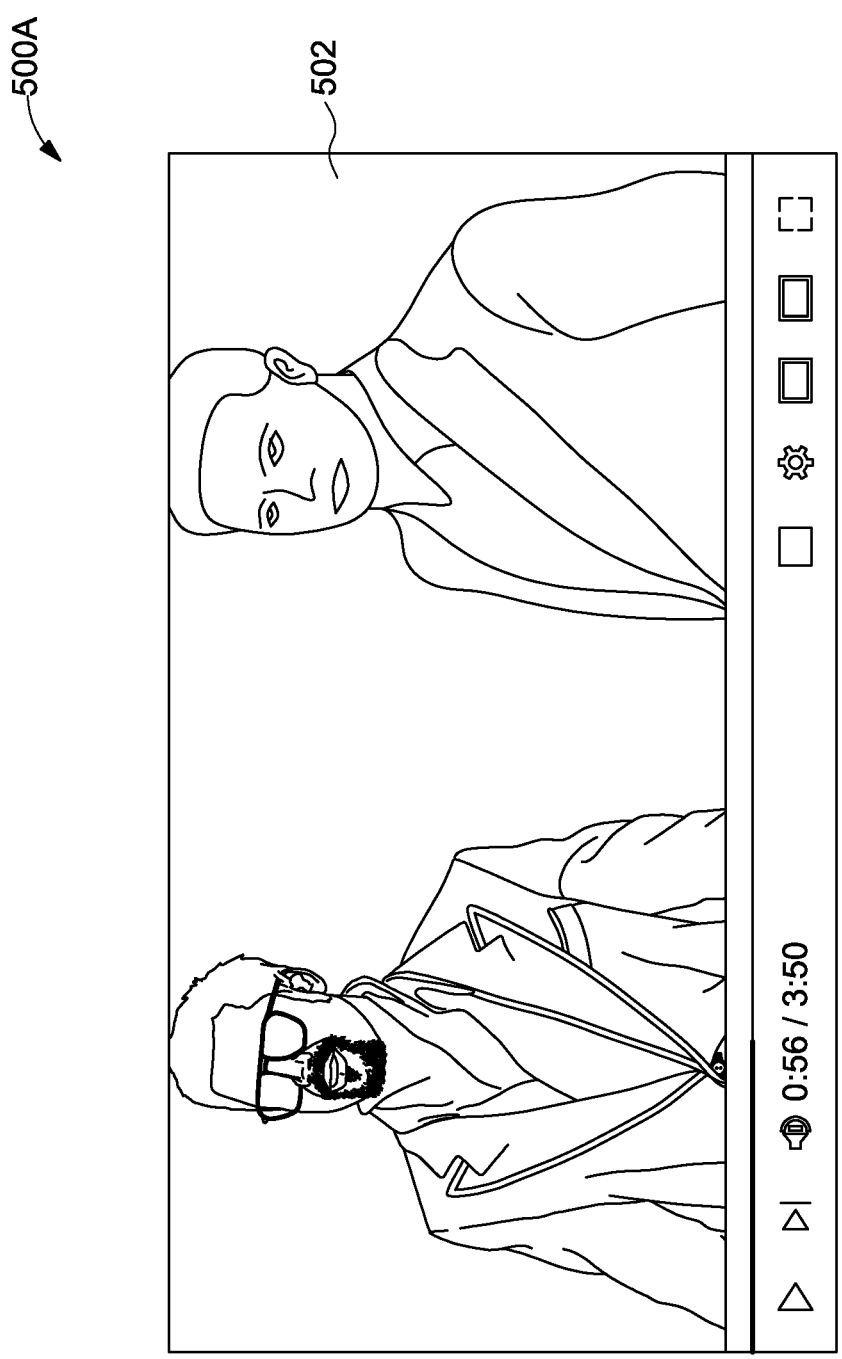
FIGS. 5A-5D represent graphical user interfaces (GUIs) depicting technique of generating a temporal token file to enable access to selective multimedia content within a multimedia file, in accordance with an exemplary embodiment.
Figure 5B:
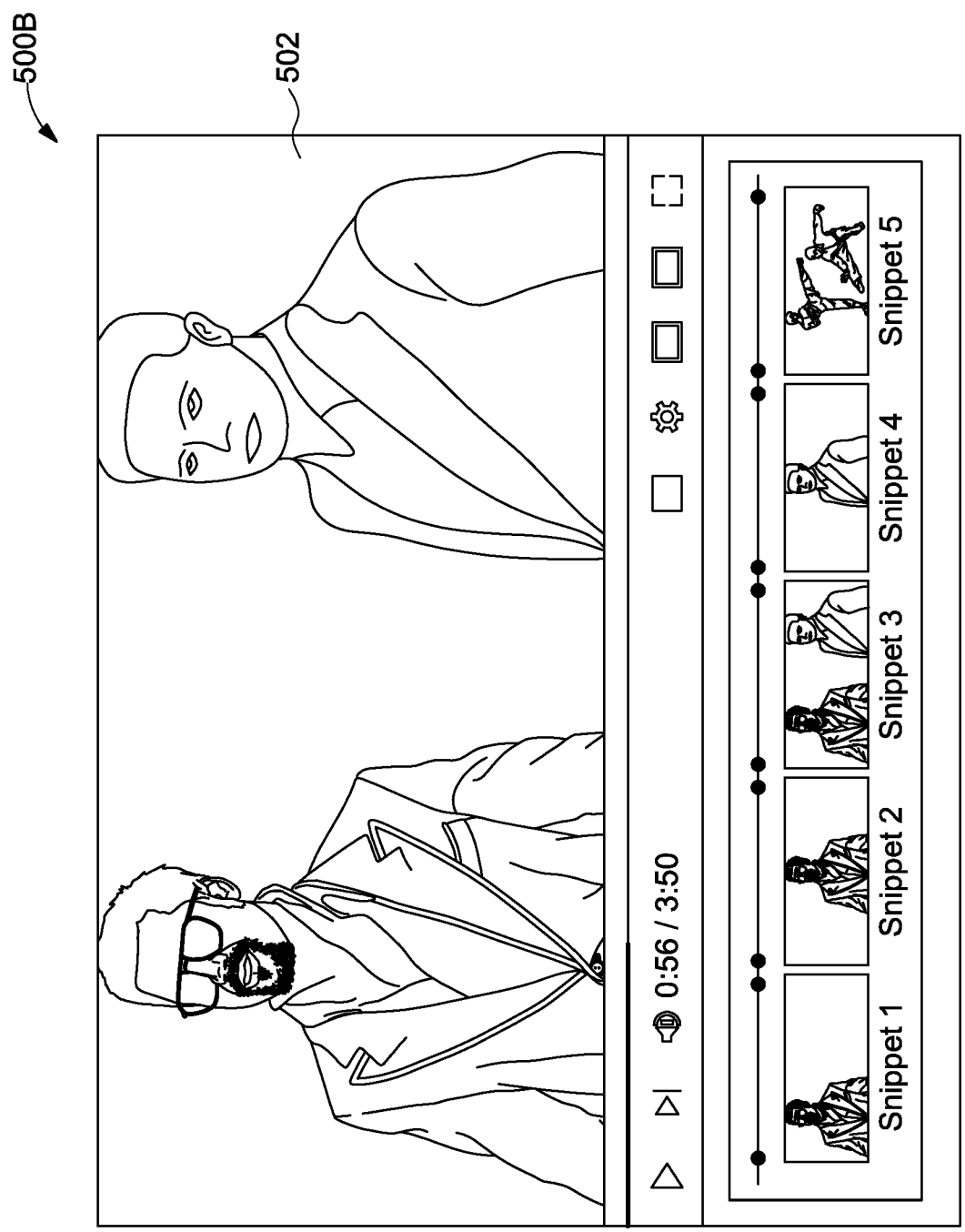
Figure 5C:
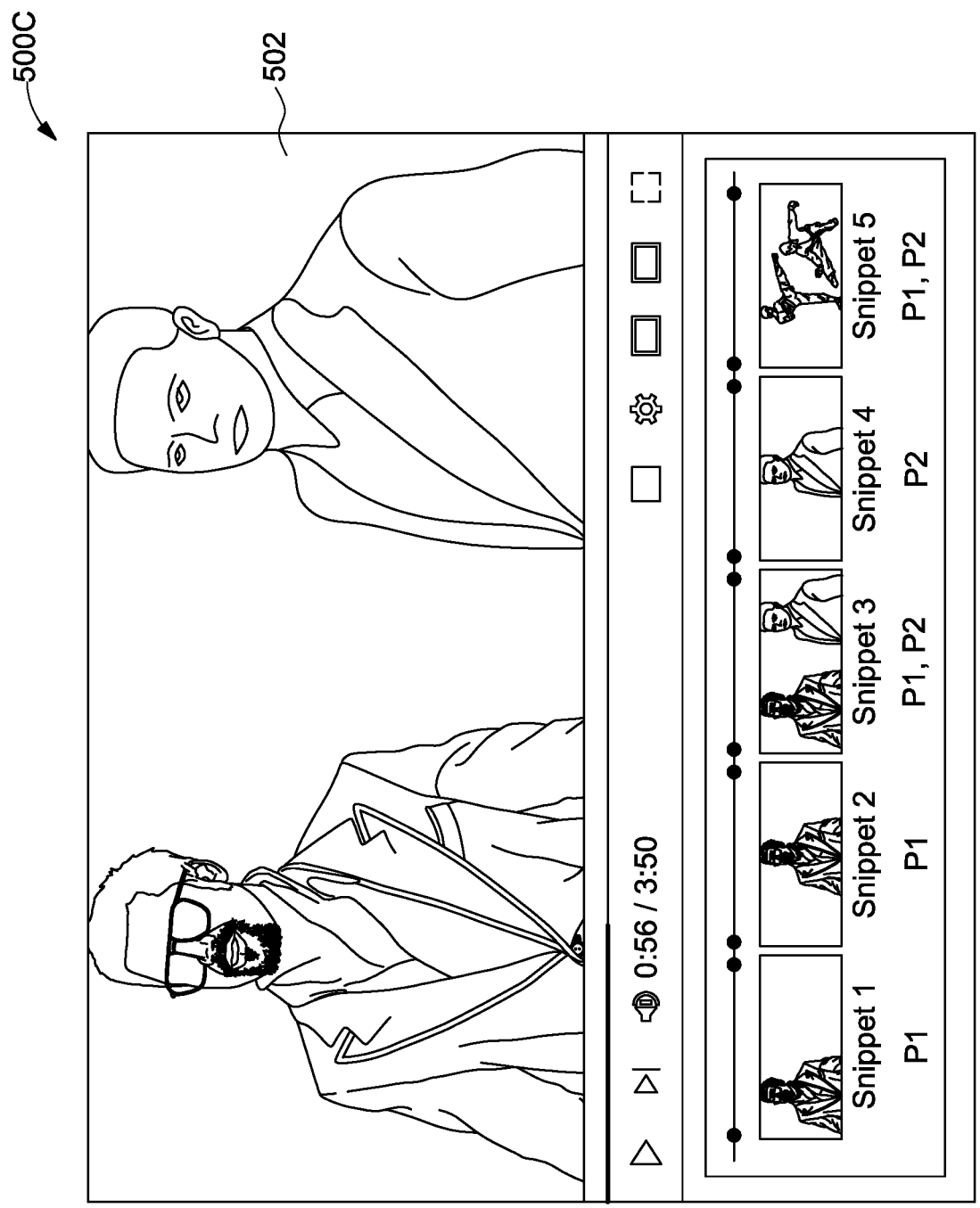
Figure 5D:
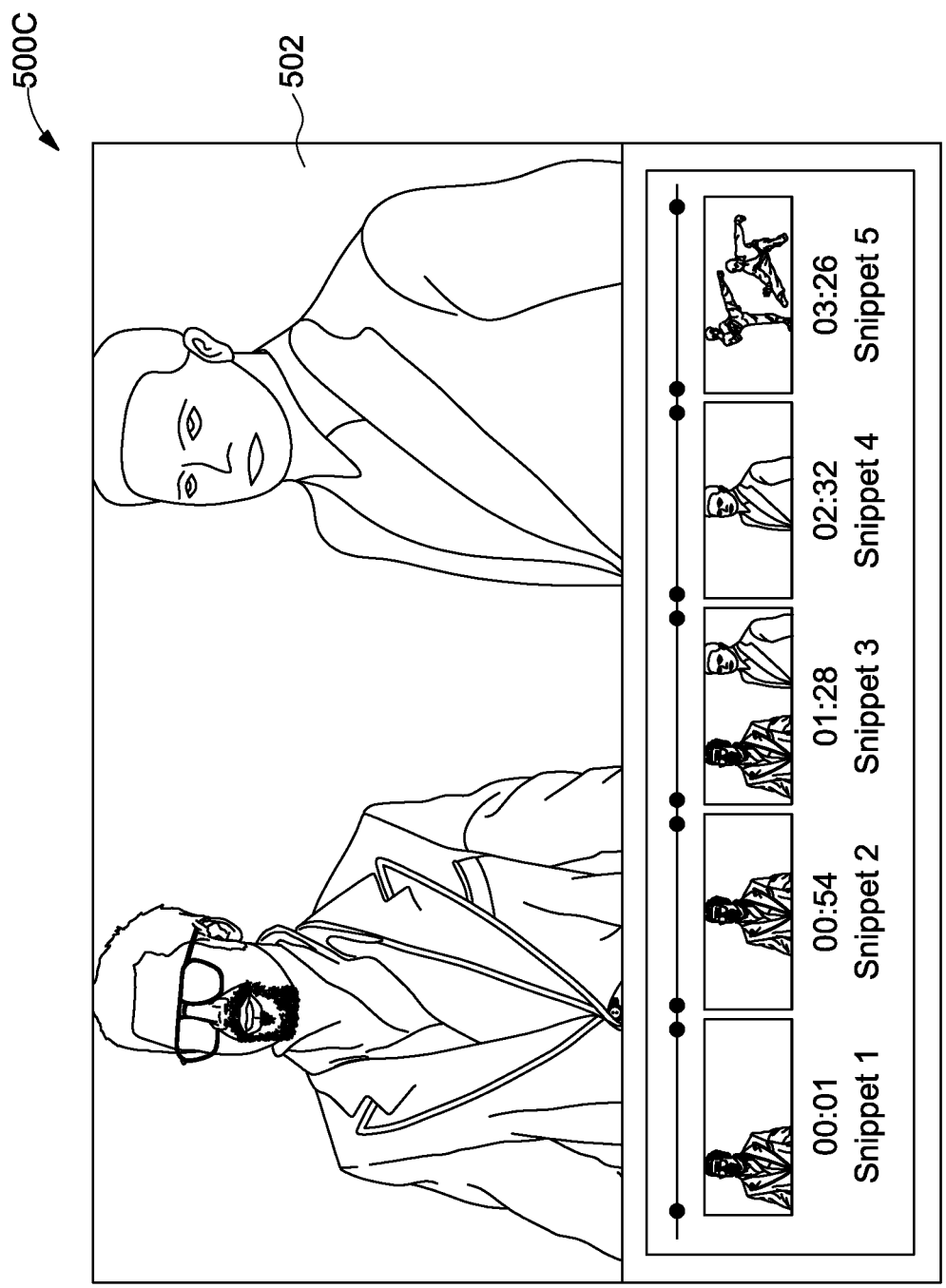

Referring now to FIGS. 5A-5C, GUIs depicting technique of generating a temporal token file to enable access to selective multimedia content within a multimedia file are represented, in accordance with an exemplary embodiment. In reference to FIG. 1, the GUIs depicted in FIG. 5A-5C may be a GUI of the electronic device 102. In FIG. 5A, a GUI 500A of the multimedia file is represented. In the GUI 500A, the multimedia file represented may correspond to a video file 502. In order to generate the temporal token file for the video file 502, the plurality of multimedia content present within the video file 502 may be identified. As depicted via the GUI 500A, the plurality of multimedia content present within the video file 502 may include the video stream and the audio stream. Once the plurality of multimedia content is identified from the video file, the token file may be generated for the plurality of multimedia content. The token file may include the textual token assigned to the one or more attributes present within the video file.

In order to generate the token file, initially, the plurality of snippets may be retrieved. The plurality of snippets retrieved from the plurality of multimedia content of the video file may be depicted as represented via a GUI 500B of FIG. 5B. By way of an example, as depicted via the GUI 500B, the plurality of snippets retrieved may correspond to a set of five snippets, i.e., snippet 1, snippet 2, snippet 3, snippet 4, and snippet 5. In present embodiment, each of the set of five snippets may represent a portion of the video file 502. Upon retrieving each of the five snippets, each of the five snippets may be annotated with the textual token using the NLP based technique. Further, each of the set of five snippets may include one or more attributes. As depicted via the GUI 500B, the one or more attributes in each of the set of five snippets may correspond to two attributes. As represented via the GUI 500B, the two attributes may be two persons.

For example, the snippet 1 and snippet 2 may include a first person. The snippet 3 and snippet 5 may include the first person and a second person. The snippet 4 may include the second person.

Further, based on the two attributes identified in the set of five snippets, the textual token representative of the two attributes may be annotated to each of the set of five snippets. As depicted via a GUI 500C of FIG. 5C, the snippet 1 may be annotated with the textual token 'P1' representative of the first person. The snippet 2 may be annotated with the textual token 'P1' representative of the first person and the. The snippet 3 may be annotated with the textual token 'P1" and "P2' representative of the first person and the second person, respectively. The snippet 4 may be annotated with the textual token 'P2' representative of the second person. And lastly, the snippet 5 may be annotated with the textual token 'P1" and "P2' representative of the first person and the second person, respectively. In an embodiment, each of the two attributes, i.e., the first person and the second person may be assigned a unique ID in real-time during identification of the number of occurrences of each of the two attributes. Once each of the set of five snippets are annotated with the textual token to generate the token file, then the generated token file may be pre-process based on the NLP based technique. This has been already explained in detail in reference to FIG. 3 and FIG. 4. Once the token file is pre-processed, the generated token file may be associated with the video file 502.

Further, upon generating the token file for the plurality of multimedia content based on the set of five snippets, then the timestamp associated with each of the set of five snippets may be extracted. The timestamp extracted for each of the set of five snippets may be represented as depicted via a GUI 500D of FIG. 5D. The extracted timestamp may signify a timestamp of an occurrence of each of the two attributes, i.e., the first person and the second person within the set of five snippets.

As depicted via the GUI 500D, the timestamp extracted for the occurrence of the first person in the snippet 1 may be '00.01'. The timestamp extracted for the occurrence of the first person in the snippet 2 may be '00.54'. The timestamp extracted for the occurrence of the first person and the second person in the snippet 3 may be '01.28'. The timestamp extracted for the occurrence of the second person in the snippet 4 may be '03.26'. The timestamp extracted for the occurrence of the first person and the second person in the snippet 5 may be '1.28'. Once the textual token is annotated to each of the set of five snippets and the timestamp is extracted for each of the set of five snippets, then the temporal token file associated with the plurality of multimedia content may be generated based on the token file and the timestamp extracted for each of the set of five snippets. This generated temporal token file may be linked with the video file 502 for providing access of selective multimedia content to the user within the video file 502.

Figure 6:
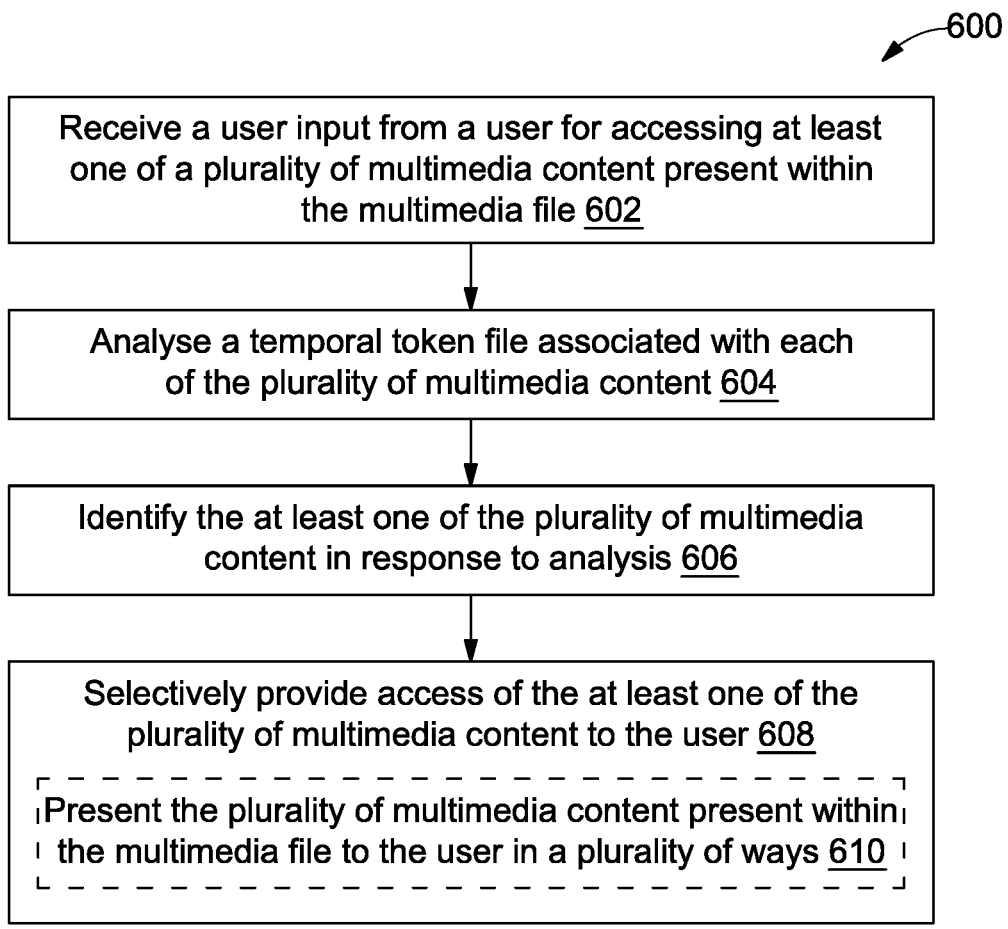
FIG. 6 illustrates a flowchart of a method for accessing selective multimedia content within a multimedia file, in accordance with an embodiment.

Referring now to FIG. 6, a flowchart of a method 600 for accessing selective multimedia content within a multimedia file is illustrated, in accordance with an embodiment. In order to provide access of selective media content to the user, initially at step 602, a user input may be received from a user. The received user input may include a request for accessing at least one of a plurality of multimedia content present within the multimedia file. In an embodiment, each of the plurality of multimedia content may include a plurality of snippets. In addition, each of the plurality of snippets may include one or more attributes. Examples of the one or more attributes may include, but is not limited to, mountain, person, animal, chair, weapon, or any entity present within the multimedia file.

With reference to FIG. 1, the user input may be provided by the user A via the electronic device 102. In an embodiment, the user input may include a user selection of at least one of a set of information associated with at least one of the plurality of snippets based on a requirement of the user. Further, the set of information may include a sentiment associated with each of the plurality of snippets, a number of occurrences of each of the one or more attributes within each of the plurality of snippets, and a content classification category. In addition to the user selection, the user input may include an input from the user for generating a summary corresponding to at least one of the plurality of multimedia content present within the multimedia file. A method of generating the summary for at least one of the plurality of multimedia content based on the user input is further explained in detail in conjunction with FIG. 7.

Upon receiving the user input, at step 604, a temporal token file associated with each of the plurality of multimedia content may be analyzed. As described above in reference to FIG. 1-FIG. 5, the temporal token file may be generated based on a token file and a timestamp associated with each of the plurality of snippets. Moreover, the token file may include a textual token representing the one or more attributes present within the plurality of snippets. Further, based on analysis of the temporal token file, at step 606, the at least one of the plurality of multimedia content that the user wants to access may be identified.

Once the at least one of the plurality of multimedia content is identified, at step 608, access of the at least one of the plurality of multimedia content may be selectively provided to the user. In other words, the user may selectively access the at least one of the plurality of multimedia content based on his requirements. In order to selectively provide the access of the at least one of the plurality of multimedia content to the user as mentioned via the step 608, at step 610, the plurality of multimedia content present within the multimedia file may be presented to the user in a plurality of ways via a GUI. By way of an example, the plurality of multimedia content may be presented to the user via a drop-down menu, a colored list, a Venn diagram, and the like. In reference to FIG. 1, the GUI may correspond to the GUI of the electronic device 102. This is further explained in detail in conjunction with FIG. 8.

Figure 7:
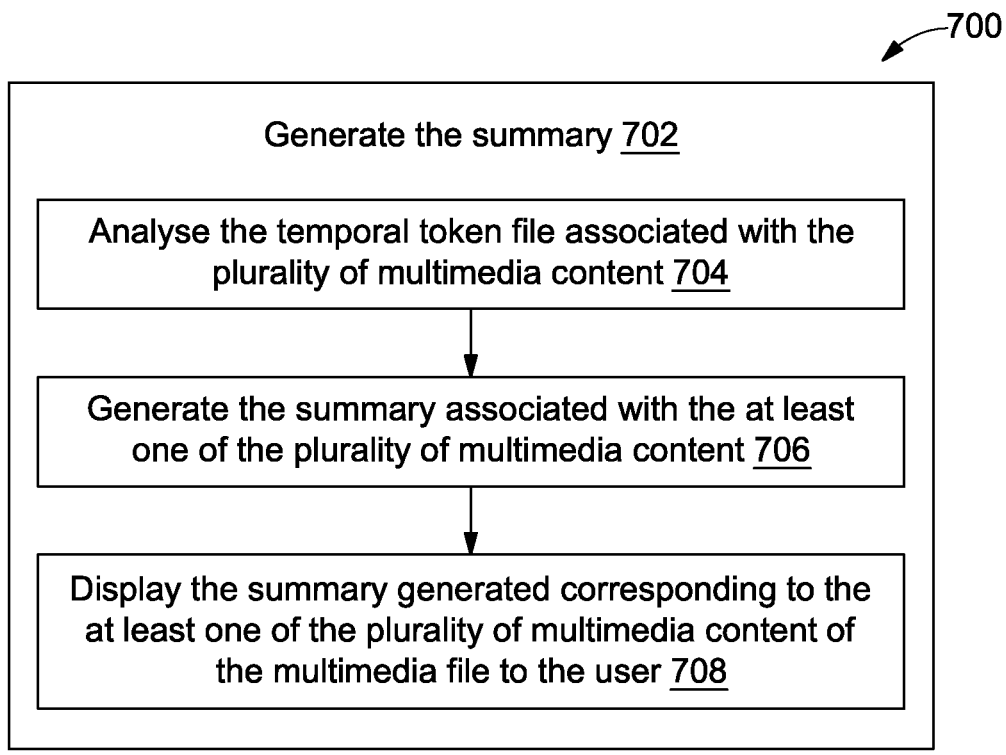
FIG. 7 illustrates a flowchart of a method for generating a summary corresponding to at least one of a plurality of multimedia content, in accordance with an embodiment.

Referring now to FIG. 7, a flowchart of a method for generating a summary for at least one of a plurality of multimedia content based on a user input is illustrated, in accordance with an embodiment. In order to generate summary corresponding to at least one of the plurality of multimedia content based on the user input as mentioned via step 702, at step 704, the temporal token file associated with the plurality of multimedia content may be analyzed. Further, based on analysis of the temporal token file, at step 706, the summary associated with the at least one of the plurality of multimedia content may be generated. In an embodiment, the summary may be generated based on the standardized set of information associated with each of the plurality of snippets.

Further, at step 708, the summary generated corresponding to the at least one of the plurality of multimedia content of the multimedia file may be displayed to the user. The displayed summary may include an image of one of the one or more attributes mapped to the corresponding textual token representing the one of the one or more attributes. In an embodiment, the mapping of the image with the corresponding textual token may be done based on the timestamp of the occurrence of each of the one or more attributes within each of the plurality of snippets. This is further explained in detail in reference to FIG. 8.

Referring now to FIGS. 8A-8D, GUIs depicting access of selective multimedia content by a user are presented, in accordance with an exemplary embodiment. As will be appreciated, FIGS. 8A-8D is explained in continuation with FIGS. 5A-5D. With reference to FIG. 1 and FIGS. 5A-5D, once the temporal token file is generated and linked with the multimedia file (i.e., the video file 502), then the user may access any multimedia content present within the multimedia file based on his requirement. In order to access selective multimedia content, initially, the user may provide the user input via the electronic device 102. As will be appreciated, the user input may be one of the voice input or the text input. Further, the user input may include a user selection of at least one of the set of information associated with at least one of the plurality of snippets. In an embodiment, the set of information may include the sentiment associated with each of the plurality of snippets, the number of occurrences of each of the one or more attributes within each of the plurality of snippets, and the content classification category. In another embodiment, the user input may include the input from the user for generating the summary. The summary may be generated corresponding to at least one of the plurality of multimedia content present within the multimedia file.

Figure 8A:
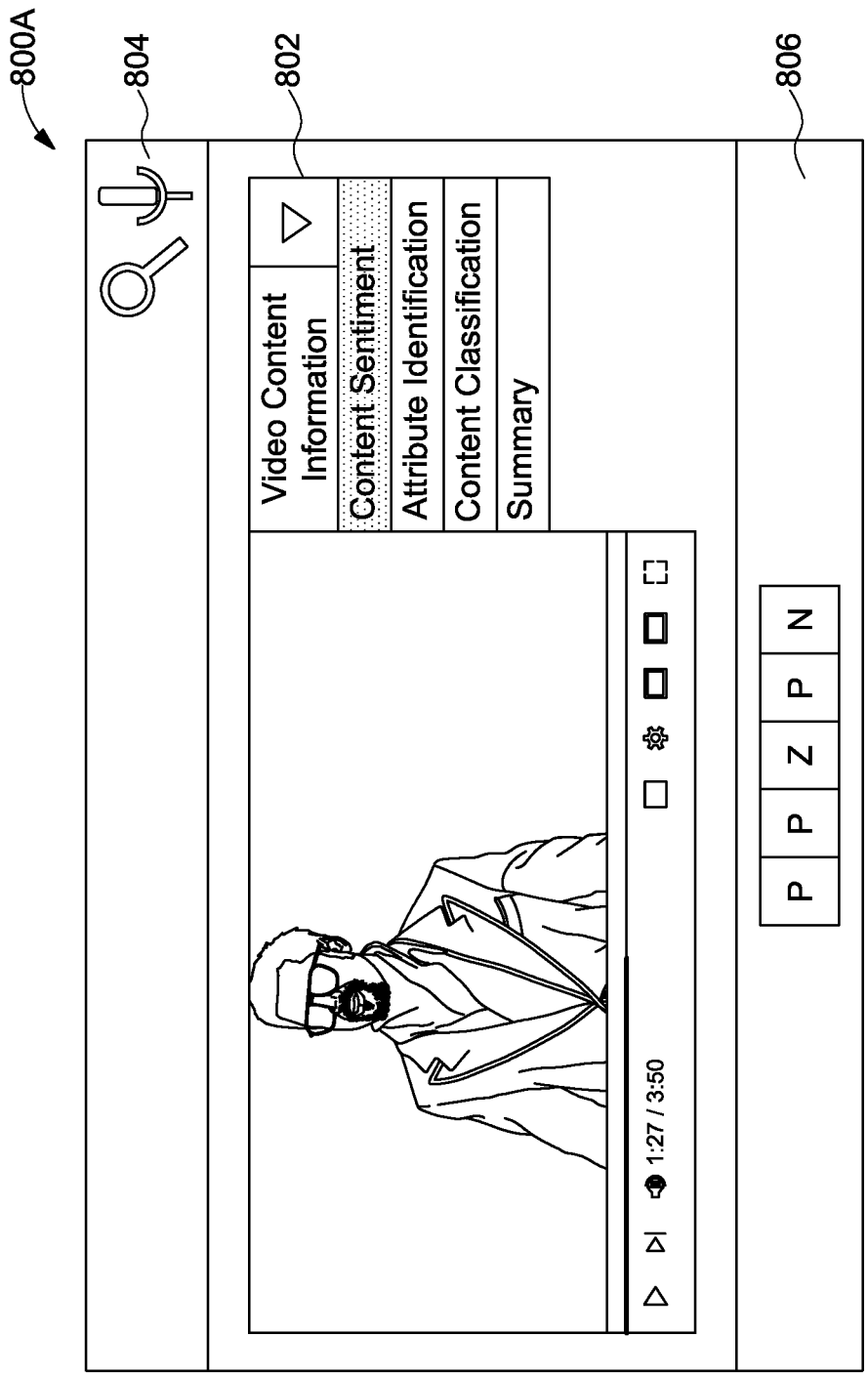
FIGS. 8A-8D represent GUIs depicting access of selective multimedia content by a user, in accordance with an exemplary embodiment.
Figure 8B:
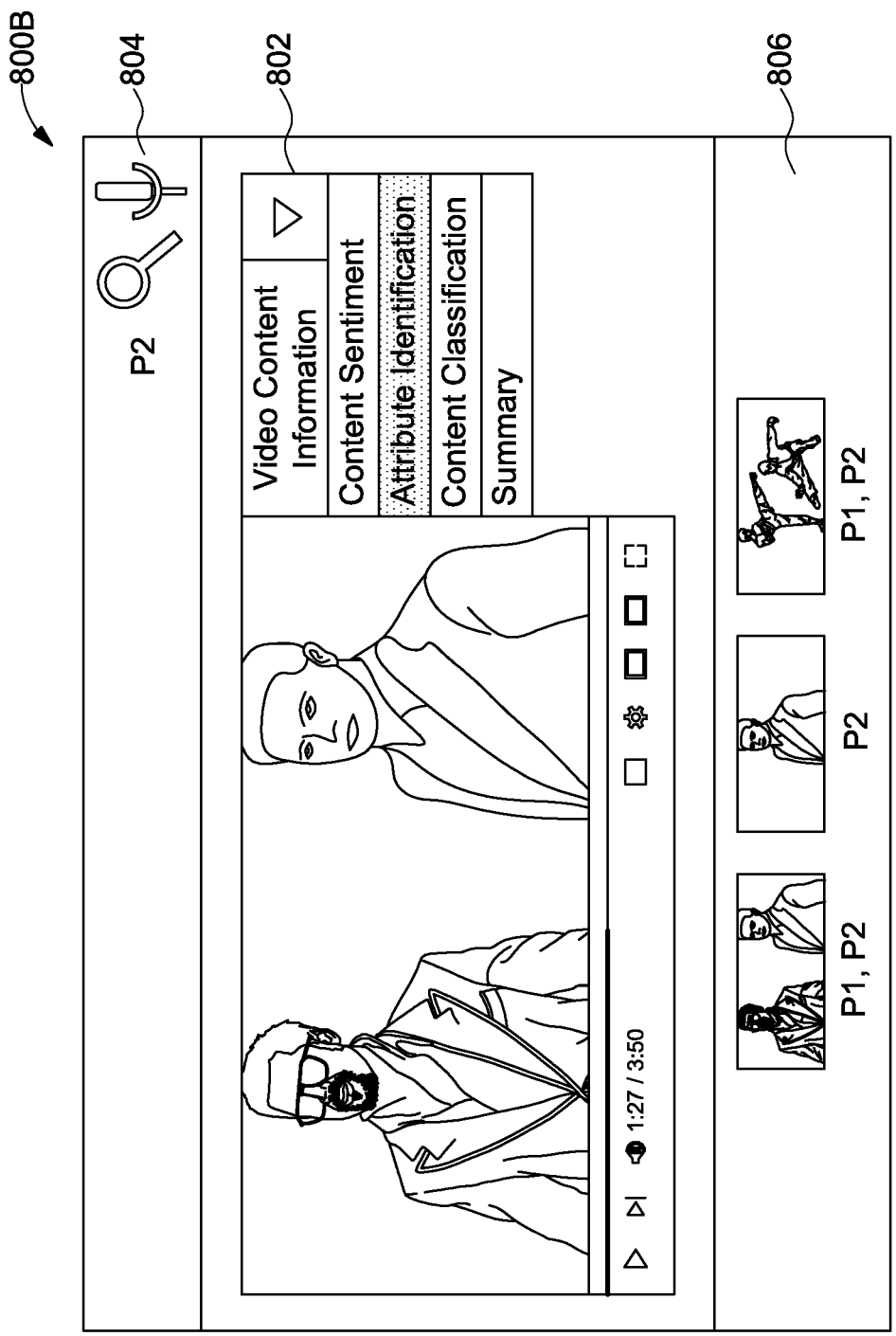
Figure 8C:
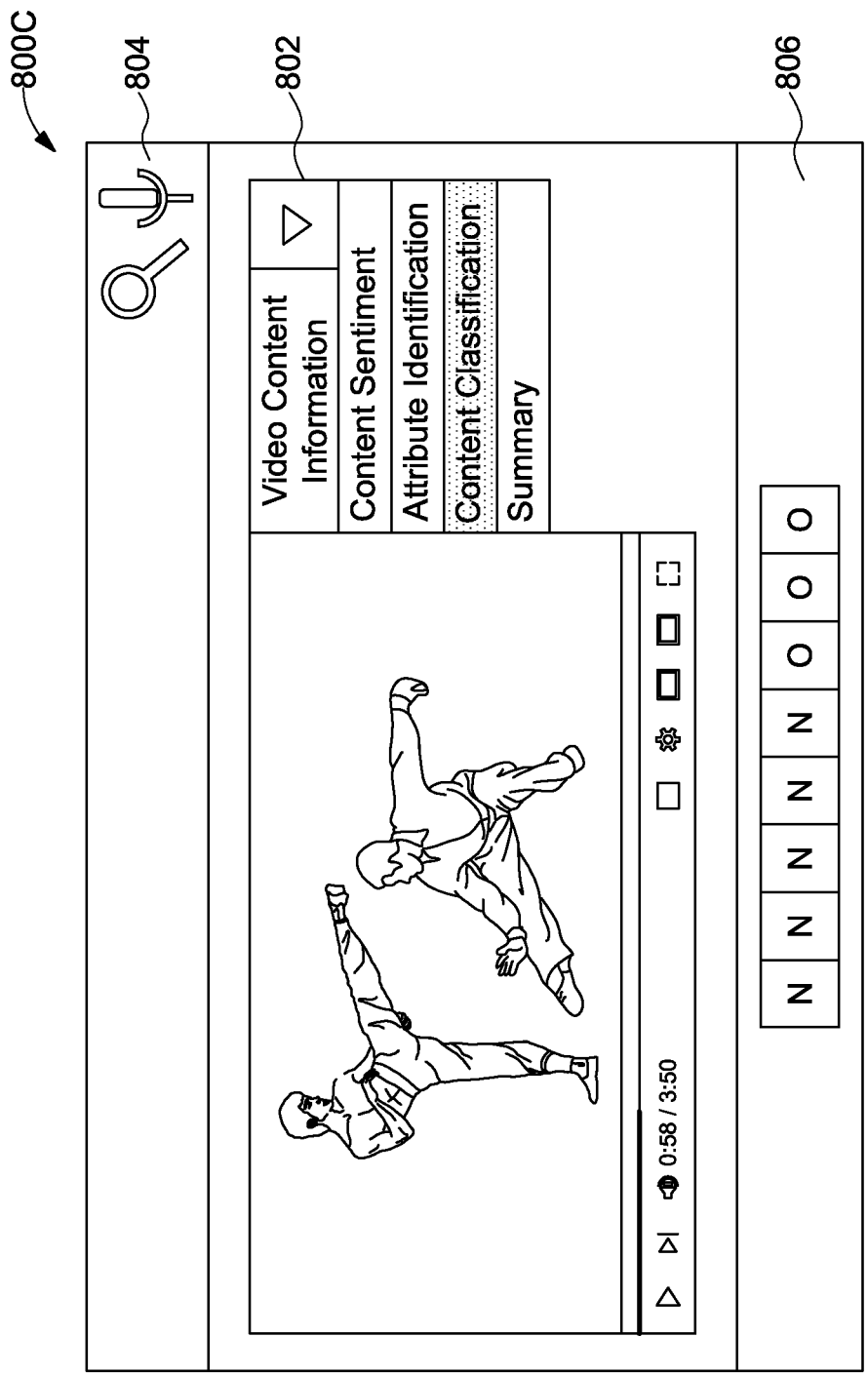
Figure 8D:
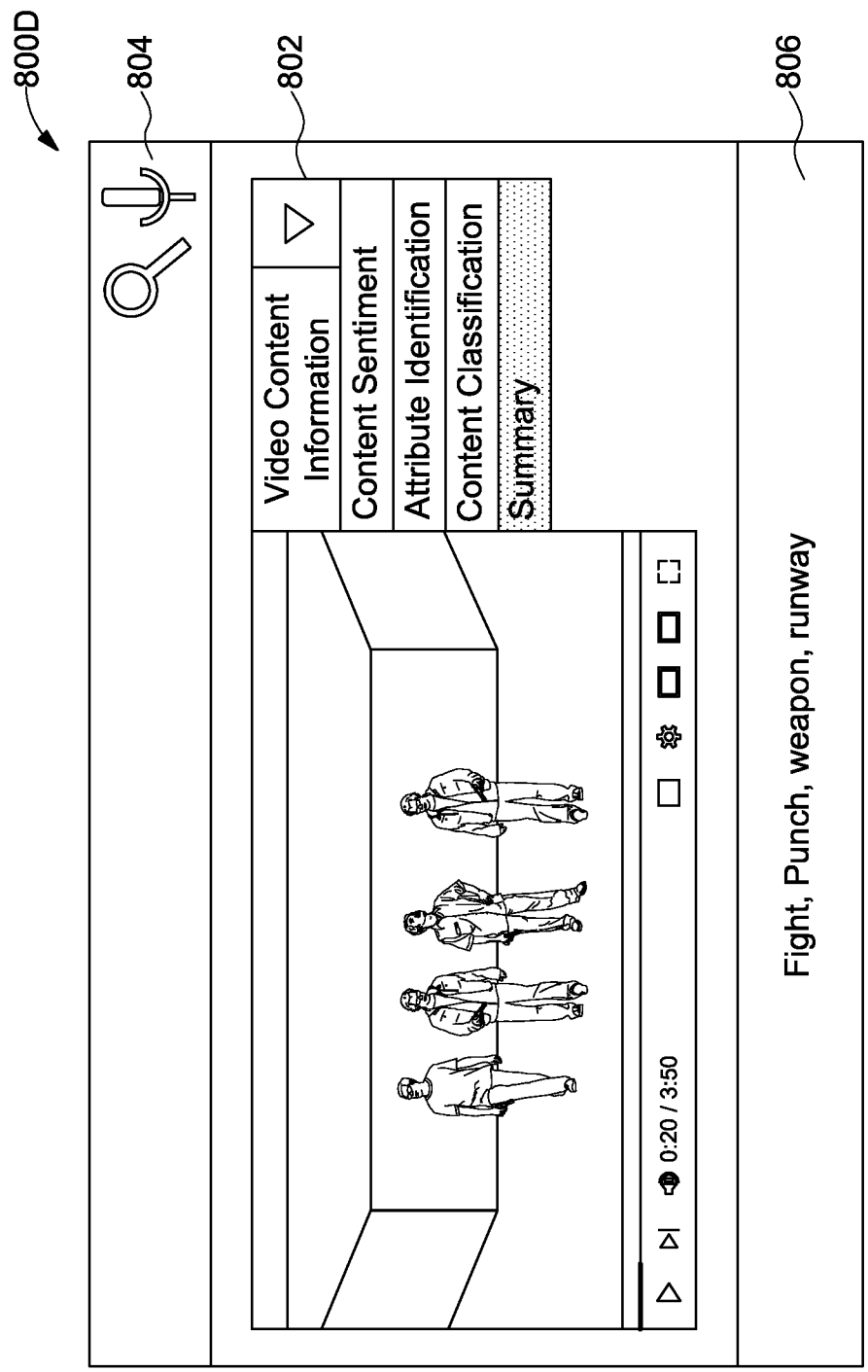

By way of an example, as depicted via a GUI 800A in FIG. 8A, when the user is interested in viewing the sentiment associated with each of the plurality of snippets, then the user input may include a user selection of a content sentiment category depicted via grey highlighted portion. The user selection may correspond to a click on the content sentiment category from a drop-down menu 802 depicted as video content information. Alternatively, the user selection may include the text input or the voice input provide by the user via a search bar 804. Upon receiving the user selection, the temporal token file associated with each of the plurality of multimedia content may be analyzed. In an embodiment, the temporal token file may be analyzed to identify the sentiment associated with each of the plurality of snippets.

The sentiment of the plurality of snippets may be at least one of the positive sentiment, the negative sentiment, or the neutral sentiment. Upon identifying the sentiments, the sentiments of each of the plurality of snippets may be presented to the user in an occurrence bar 806. In continuation to FIGS. 5A-5D, when the multimedia file is the video file 502 and the plurality of snippets retrieved is the set of five snippets, then the sentiment of each of the set of five snippets rendered to the user may be 'P' for positive sentiment, 'N' for negative sentiment, and 'Z' for neutral sentiment. Based on analysis of the temporal token file for identifying the sentiment of each of the set of five snippets, the sentiment of each of the set of five snippets may be presented to the user as 'P', 'P', 'Z', 'P', 'N' in the occurrence bar 806 as depicted via the GUI 800A. In an embodiment, the 'P', 'N', 'Z' may correspond to the textual token assigned to each of the plurality of snippets.

By way of another example, when the user is interested in viewing multimedia content associated to a particular attribute, for example: person 'P2', then the user may select 'attribute identification category' from the drop-down menu 802 as depicted via grey highlighted portion in a GUI 800B. In an alternate embodiment, the user may view the multimedia content associated with the person 'P2' by providing the voice input or the text input, i.e., 'P2' in the search bar 804. Upon receiving the user input, the temporal token file associated with each of the plurality of multimedia content present within the multimedia file may be analyzed. The temporal token file may be analyzed to identify the attribute, i.e., person 'P2' with each of the set of five snippets. Based on the analysis, each of the set of five snippets, a subset of snippets having the person 'P2' from the set of five snippets may be rendered to the user. As depicted via the GUI 800B, the subset of snippets, i.e., the snippet 3, the snippet 4, and the snippet 5 having the person 2 may be presented to the user via the occurrence bar 806. Then the user may selectively access each of the subset of snippets associated with the person 'P2' based on his requirement. In an embodiment, the 'P1', 'P2' may correspond to the textual token assigned to each of the plurality of snippets.

By way of yet another example, when the user is interested in viewing a multimedia content present within the multimedia file based on the content classification category, then the user may select 'content classification category' from the drop-down menu 802 as depicted via grey highlight portion in a GUI 800C. In alternate embodiment, in order to view the multimedia content based on the content classification category, the user may provide the text input or the voice input including a content classification category, for example: objectionable content category using the search bar 804. The content classification category associated with each of the plurality of snippets is at least one of the objectionable content category, the non-objectionable content category, the offensive content category, and the unwanted content category.

Upon receiving the user input, the temporal token file associated with each of the plurality of multimedia content may be analyzed. The temporal token file may be analyzed to identify the objectionable content category the plurality of multimedia content of the multimedia file. Based on the analysis, the multimedia content with the objectionable content category may be rendered to the user. As depicted via the GUI 800C, the multimedia content with the objectionable content category may be presented to the user with the textual token 'O' in the occurrence bar 806. Moreover, the textual token 'N' may represent non-objectionable content category. Similarly, a textual token 'V' and 'U' may be assigned to the offensive content category and the unwanted content category respectively, during the generation of the token file. Further, the user may selectively access the multimedia content based on the associated content classification category as per his requirement.

By way of yet another example, when the user is interested in viewing summary of the plurality of multimedia content present within the multimedia file, then the user may select 'summary' from the drop-down menu 802 as depicted via grey highlight portion in a GUI 800D. In alternate embodiment, in order to view the summary, the user may provide the voice input or the text input, for example, 'generate summary' in the search bar 804. Upon receiving the user input for generating the summary, the temporal token file associated with each of the plurality of multimedia content may be analyzed.

The temporal token file may be analyzed to generate the summary based on the plurality of multimedia content. Further, based on the analysis of the temporal token file, the summary may be generated for at least one of the plurality of multimedia content. The generated summary may be presented to the user in the occurrence bar 806 as depicted via the GUI 800D. In an embodiment, the image of one of the one or more attributes may be mapped to corresponding textual token representing one of the one or more attributes. In the present FIG. 8D, as depicted via the GUI 800D, the summary generated for at least one of the plurality of multimedia content present, i.e., the video stream within the multimedia file (i.e., the video file) may include words like 'fight, punch, weapon, runway' and the image corresponding to the generated summary may be mapped and presented to the user.

As will be appreciated, apart from the above discussed examples, the set of information associated with the plurality of multimedia content present within the multimedia may be presented to the user in the plurality of ways. For example, the set of information presented to the user may be as a highlighted content in the multimedia file, or in a form of a list, and the like. Moreover, one or more user selected information from the set of may be presented to the user with a (+/−) delta time window.

Various embodiments provide method and system for generating a temporal token file to enable access to selective multimedia content within a multimedia file. The disclosed method and system may identify a plurality of multimedia content present within the multimedia file. Each of the plurality of multimedia content may comprise at least one of an audio stream and a video stream. Further, the disclosed method and system may generate a token file for each of the plurality of multimedia content. To generate the token file, the disclosed method and system may retrieve a plurality of snippets from each of the plurality of multimedia content. Further, to generate the token file, the disclosed method and system may annotate each of the plurality of snippets with a textual token based on a Natural Language Processing (NLP) based technique. Each of the plurality of snippets may include one or more attributes, and each of the textual token may represent one of the one or more attributes. Further, the disclosed method and the system may extract a timestamp associated with each of the plurality of snippets. The extracted timestamp may signify a timestamp of an occurrence of each of the one or more attributes within each of the plurality of snippets. Thereafter, the disclosed method and the system may generate the temporal token file associated with each of the plurality of multimedia content based on the token file and the timestamp extracted for each of the plurality of snippets. The temporal token file may be linked to the multimedia file.

The disclosed method and system may provide some advantages like, the disclosed method and the system may enable user to quickly download and view a portion of a video the user is interested in watching from online media platform in order to reduce bandwidth. In addition, the disclosed method and system may enable user to directly jump to interested content of an offline video without having to view the complete video by quickly identifying the interested content in the video. This helps to save a lot of time of the user for searching the interested content in the video. Further, the disclosed method and system may enable easy identification of videos similar to the video of interest from a corpus of videos.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of generating a temporal token file to enable access to selective multimedia content within a multimedia file, the method comprising:
   identifying, via an electronic device, a plurality of multimedia content present within the multimedia file, wherein each of the plurality of multimedia content comprises at least one of an audio stream and a video stream;
   generating, by the electronic device, a token file for each of the plurality of multimedia content, wherein generating the token file comprises:
      retrieving a plurality of snippets from each of the plurality of multimedia content; and
      annotating each of the plurality of snippets with a textual token based on a Natural Language Processing (NLP) based technique, wherein each of the plurality of snippets includes one or more attributes, and wherein each of the textual token represents one of the one or more attributes;
   extracting, by the electronic device, a timestamp associated with each of the plurality of snippets, wherein the extracted timestamp signifies a timestamp of an occurrence of each of the one or more attributes within each of the plurality of snippets; and
   generating, by the electronic device, the temporal token file associated with each of the plurality of multimedia content based on the token file and the timestamp extracted for each of the plurality of snippets, wherein the temporal token file is linked to the multimedia file.

2. The method of claim 1, wherein generating the token file further comprising:
   pre-processing the token file based on the NLP based technique; and
   associating the token file with the multimedia file after pre-processing.

3. The method of claim 2, wherein pre-processing the token file further comprises:
   analysing the token file associated with each of the plurality of multimedia content;
   extracting a set of information associated with each of the plurality of snippets based on the analysis of the token file, wherein extracting comprises:

determining a sentiment associated with each of the plurality of snippets by applying a first Natural Language Processing (NLP) based sentiment analysis technique;

identifying a number of occurrences of each of the one or more attributes within each of the plurality of snippets by applying a second NLP based recognition technique; and determining a content classification category for each of the plurality of snippets by applying one of a third NLP based classification techniques;

standardizing the set of information extracted for each of the plurality of snippets; and storing the standardize set of information for each of the plurality of snippets in a database.

4. The method of claim 3, wherein the sentiment of the plurality of snippets is at least one of a positive sentiment, a negative sentiment, or a neutral sentiment.

5. The method of claim 3, wherein each of the one or more attributes is assigned a unique Identification (ID) in real-time during identification of the number of occurrences of each of the one or more attributes.

6. The method of claim 3, wherein the content classification category associated with each of the plurality of snippets is at least one of an objectionable content category, a non-objectionable content category, an offensive content category, and an unwanted content category.

7. A system for generating a temporal token file to enable access to selective multimedia content within a multimedia file, the system comprising:

a processor; and a memory coupled to the processor, wherein the memory stores processor-executable instructions, which, on execution, causes the processor to:

identify a plurality of multimedia content present within the multimedia file, wherein each of the plurality of multimedia content comprises at least one of an audio stream and a video stream;

generate a token file for each of the plurality of multimedia content, wherein, to generate the token file, the processor-executable instructions further cause the processor to:

retrieve a plurality of snippets from each of the plurality of multimedia content; and annotate each of the plurality of snippets with a textual token based on a Natural Language Processing (NLP) based technique, wherein each of the plurality of snippets includes one or more attributes, and wherein each of the textual token represents one of the one or more attributes;

extract a timestamp associated with each of the plurality of snippets, wherein the extracted timestamp signifies a timestamp of an occurrence of each of the one or more attributes within each of the plurality of snippets; and generate the temporal token file associated with each of the plurality of multimedia content based on the token file and the timestamp extracted for each of the plurality of snippets, wherein the temporal token file is linked to the multimedia file.

8. The system of claim 7, wherein, to generate the token file, the processor-executable instructions further cause the processor to:

pre-process the token file based on the NLP based technique; and associate the token file with the multimedia file after pre-processing.

9. The system of claim 8, wherein, to pre-process the token file, the processor-executable instructions further cause the processor to:

analyse the token file associated with each of the plurality of multimedia content;

extract a set of information associated with each of the plurality of snippets based on the analysis of the token file, wherein to extract, the processor-executable instructions further cause the processor to:

determine a sentiment associated with each of the plurality of snippets by applying a first Natural Language Processing (NLP) based sentiment analysis technique;

identify a number of occurrences of each of the one or more attributes within each of the plurality of snippets by applying a second NLP based recognition technique; and determine a content classification category for each of the plurality of snippets by applying one of a third NLP based classification techniques;

standardize the set of information extracted for each of the plurality of snippets; and store the standardize set of information for each of the plurality of snippets in a database.

10. The system of claim 9, wherein the sentiment of the plurality of snippets is at least one of a positive sentiment, a negative sentiment, or a neutral sentiment.

11. The system of claim 9, wherein each of the one or more attributes is assigned a unique Identification (ID) in real-time during identification of the number of occurrences of each of the one or more attributes.

12. The system of claim 9, wherein the content classification category associated with each of the plurality of snippets is at least one of an objectionable content category, a non-objectionable content category, an offensive content category, and an unwanted content category.

* * * * *